United States Patent
Zhou et al.

(10) Patent No.: US 7,643,719 B1
(45) Date of Patent: Jan. 5, 2010

(54) SUPERLENS AND A METHOD FOR MAKING THE SAME

(75) Inventors: Yan Zhou, Pleasanton, CA (US); Seng-Tiong Ho, Wheeling, IL (US)

(73) Assignee: Phosistor Technologies, Inc., Pleasanton, CA (US)

( * ) Notice: Subject to any disclaimer, the term of this patent is extended or adjusted under 35 U.S.C. 154(b) by 495 days.

(21) Appl. No.: 10/708,536

(22) Filed: Mar. 10, 2004

Related U.S. Application Data

(60) Provisional application No. 60/454,806, filed on Mar. 14, 2003.

(51) Int. Cl.
*G02B 6/10* (2006.01)
*G02B 6/32* (2006.01)

(52) U.S. Cl. .................. 385/131; 385/129; 385/130; 385/34

(58) Field of Classification Search .................. 359/653
See application file for complete search history.

(56) References Cited

U.S. PATENT DOCUMENTS

| | | | | |
|---|---|---|---|---|
| 5,044,737 A | * | 9/1991 | Blankenbecler | 359/653 |
| 5,621,574 A | * | 4/1997 | Foo | 359/653 |
| 5,689,374 A | * | 11/1997 | Xu et al. | 359/652 |
| 5,861,934 A | * | 1/1999 | Blum et al. | 351/169 |
| 2003/0044118 A1 | * | 3/2003 | Zhou et al. | 385/43 |
| 2003/0067688 A1 | * | 4/2003 | Wang | 359/652 |
| 2004/0042729 A1 | * | 3/2004 | Zhou et al. | 385/49 |

OTHER PUBLICATIONS

U.S. Appl. No. 10/651,372, filed Aug. 28, 2003, Yan Zhou et al.
U.S. Appl. No. 10/652,269, filed Aug. 28, 2003, Yan Zhou et al.
U.S. Appl. No. 10/083,674, filed Oct. 19, 2001, Yan Zhou et al.

* cited by examiner

*Primary Examiner*—Frank G Font
*Assistant Examiner*—Erin D Chiem
(74) *Attorney, Agent, or Firm*—Brinks, Hofer, Gilson & Lione

(57) ABSTRACT

A superlens for controlling the size and the phase of an electromagnetic beam that passes through it, and a method for independently controlling the horizontal and vertical focusing of the electromagnetic beam using the superlens is provided. The superlens comprises a vertically GRIN multi-layer structure with one or more horizontally curved sidewalls. The vertical focusing is controlled by varying the longitudinal thickness of the multi-layer structure. The horizontal focusing is controlled by varying the profile and the radius of curvature of the horizontally curved sidewalls. Varying the thickness and radius of curvature is done by etching. Also provided is a method for making the superlens.

29 Claims, 25 Drawing Sheets

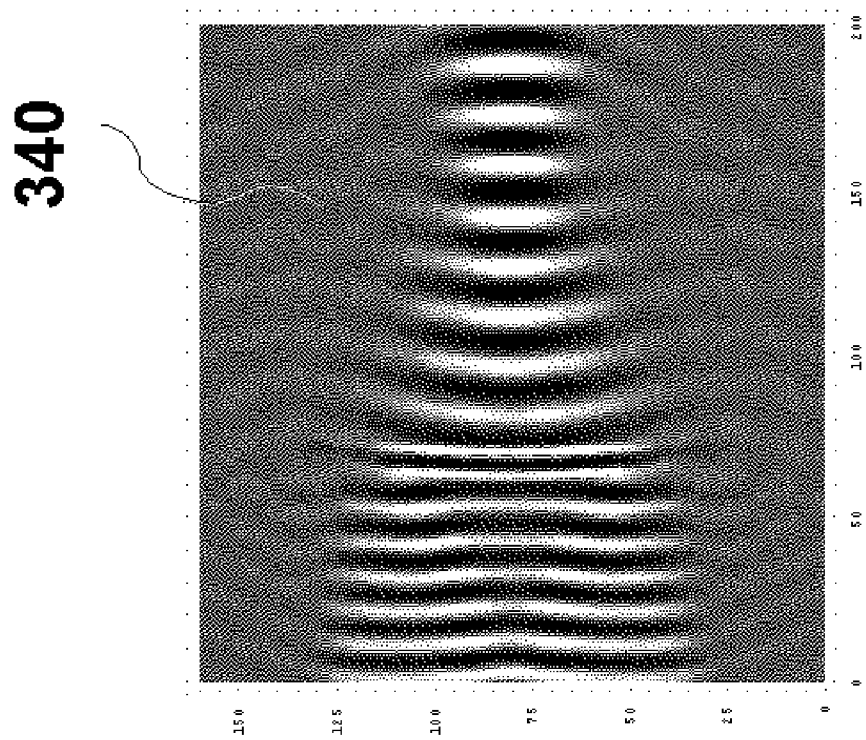
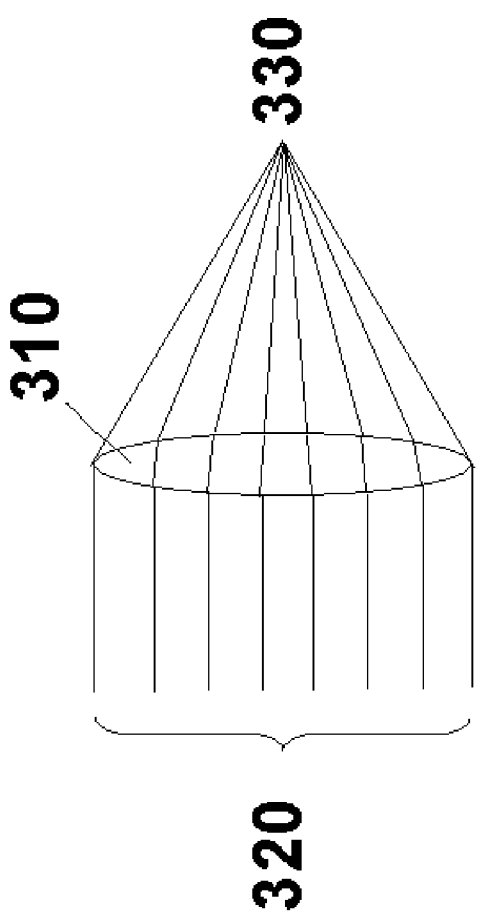
Fig. 3 (a)
Fig. 3 (b)

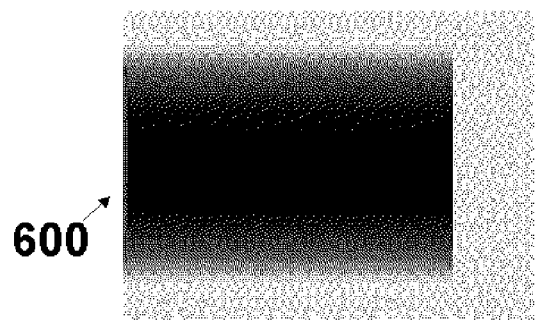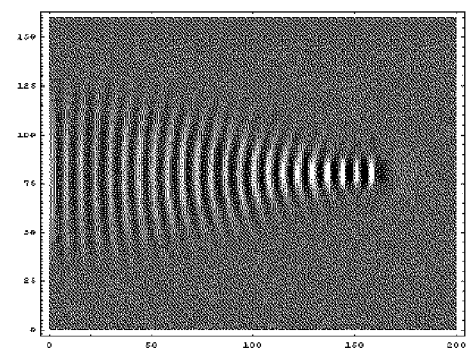
FIG. 6(a)
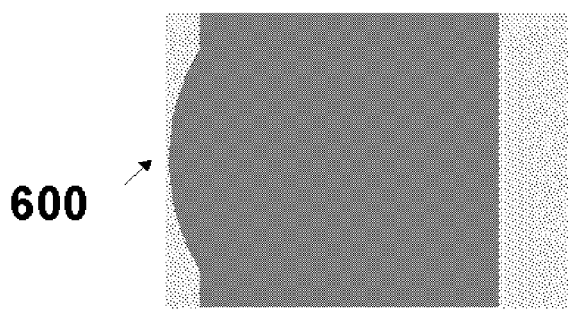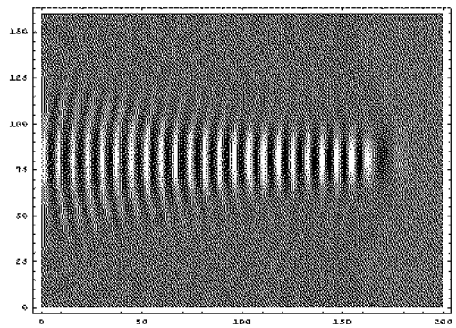
FIG. 6(b)

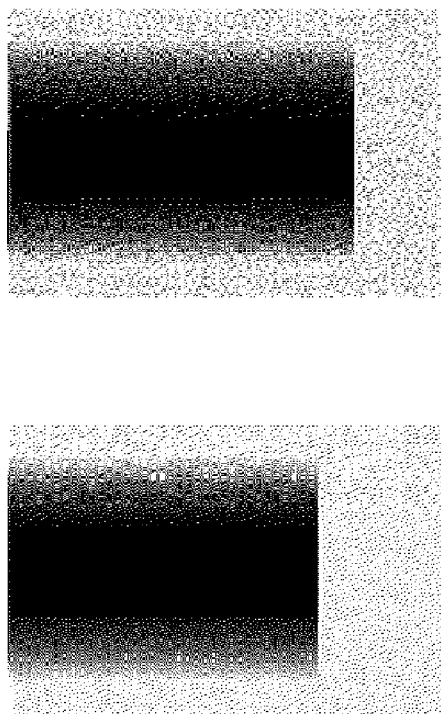
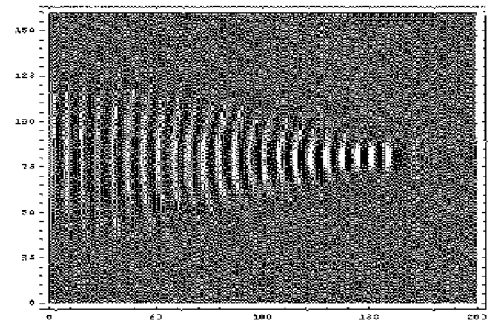
FIG. 7(a)
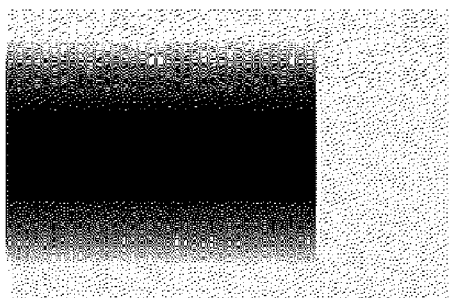
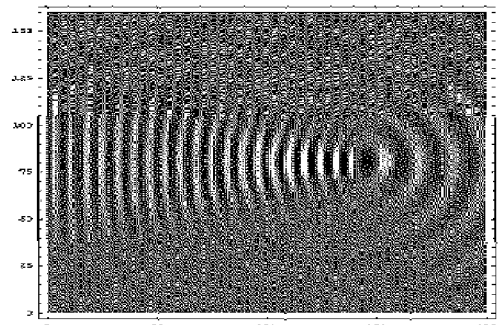
FIG. 7(b)

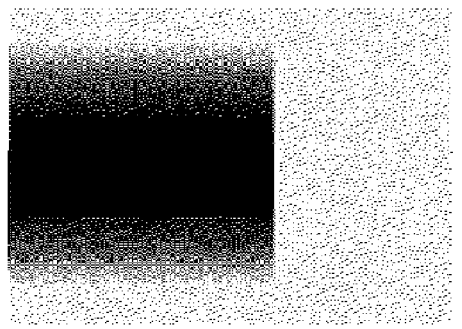 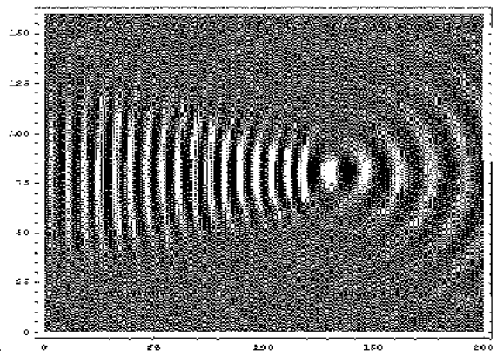
FIG. 7(c)
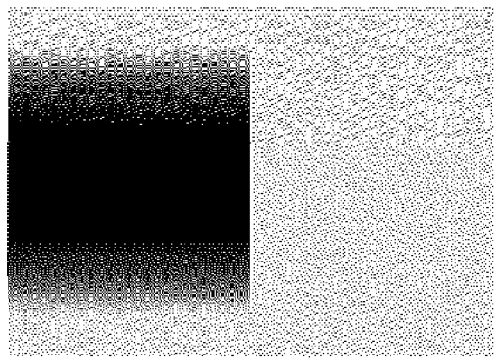 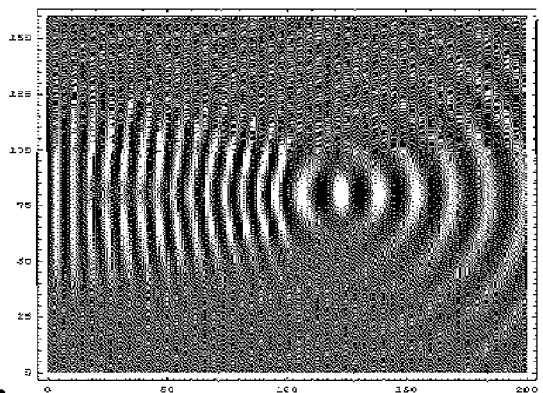
FIG. 7(d)

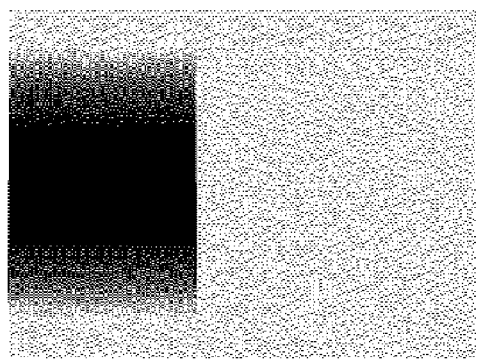
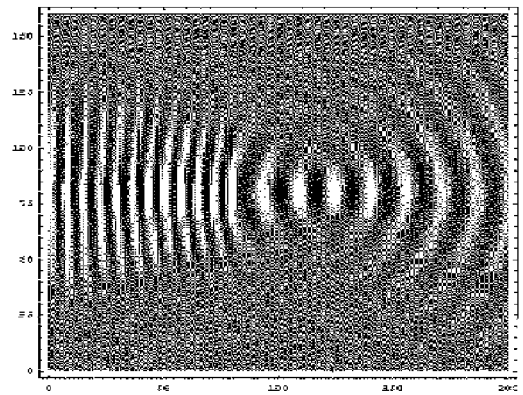
FIG. 7(e)
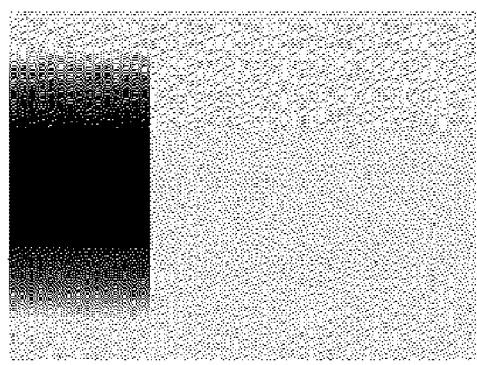
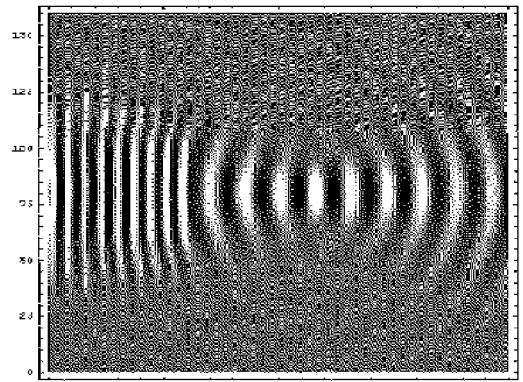
FIG. 7(f)

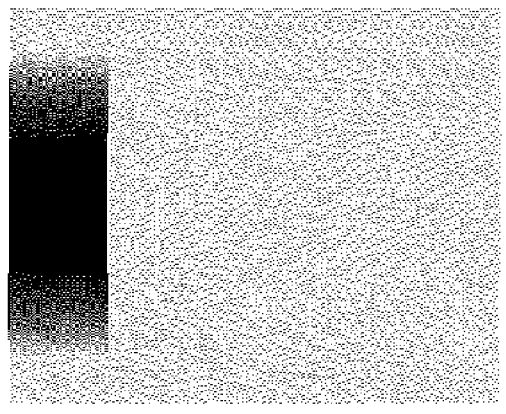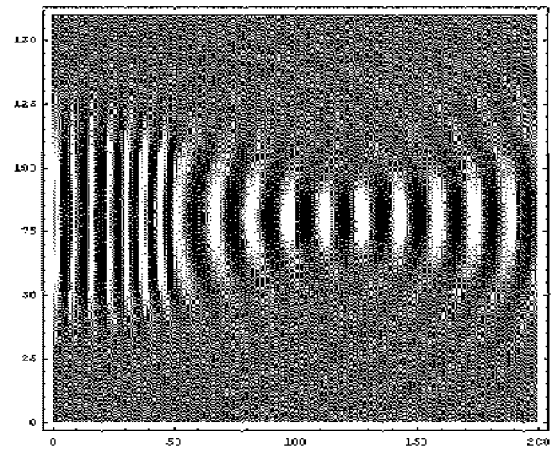
FIG. 7(g)

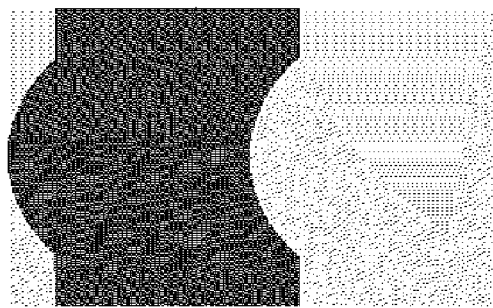 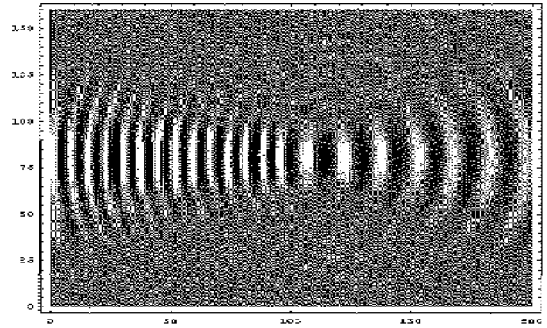
FIG. 8(a)
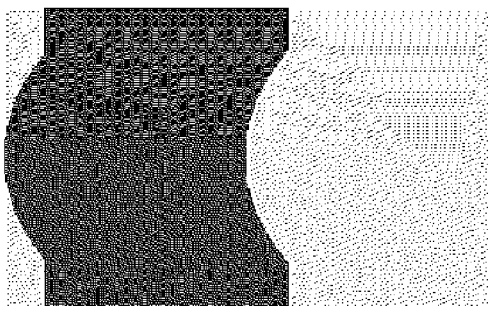 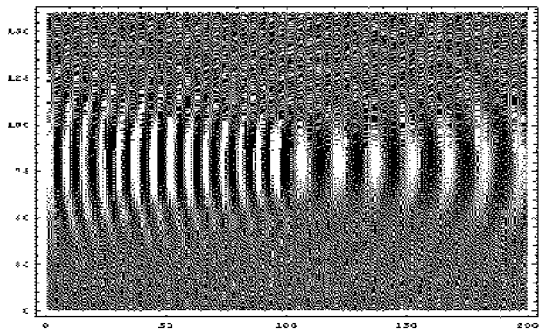
FIG. 8(b)

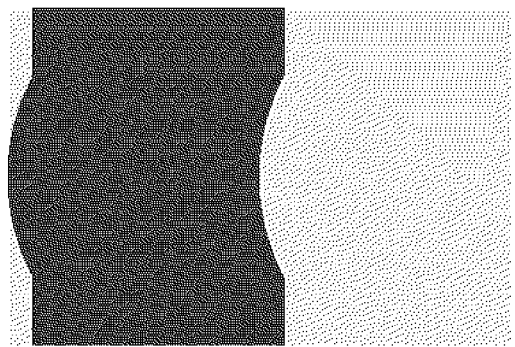 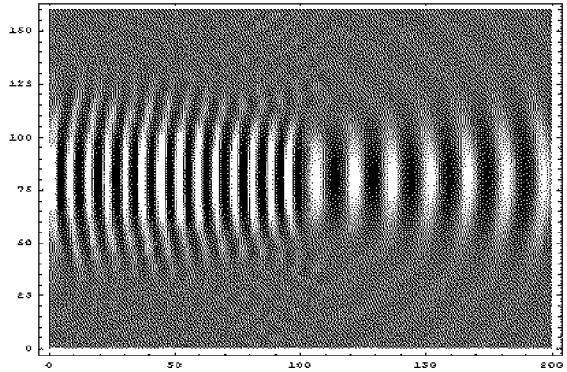
FIG. 8(c)
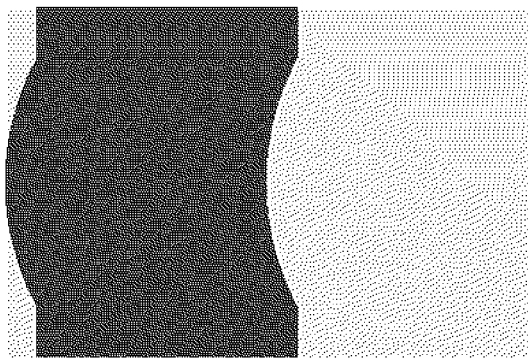 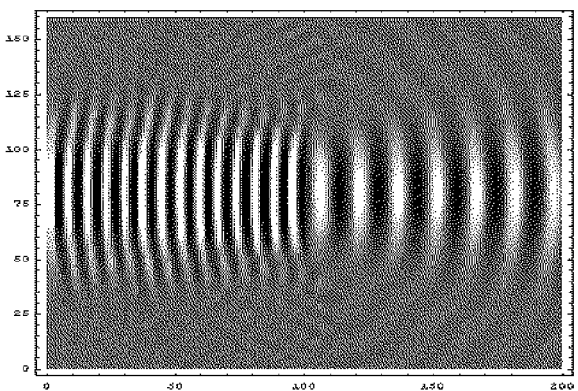
FIG. 8(d)

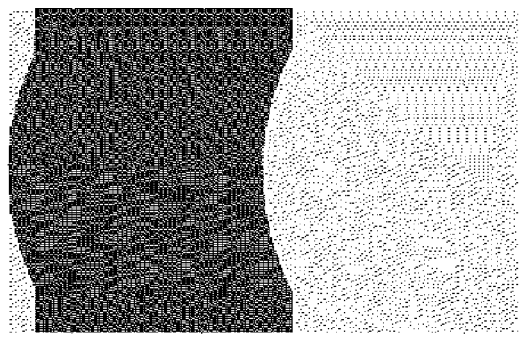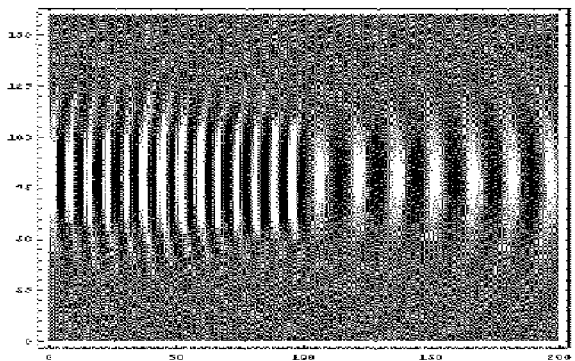
FIG. 8(e)
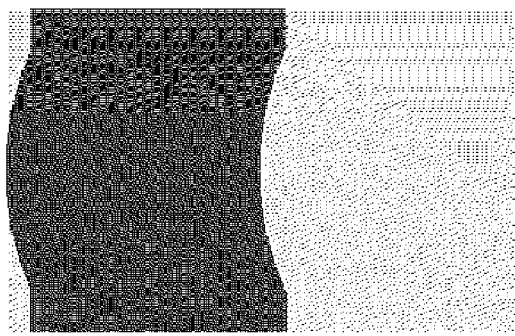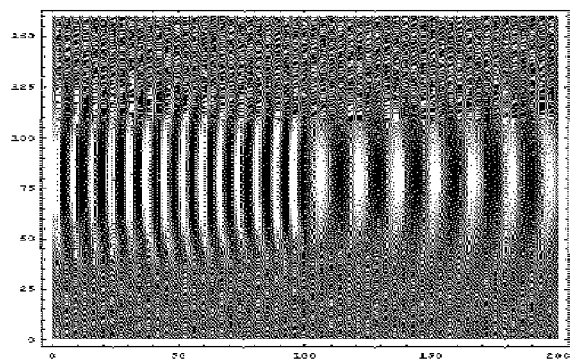
FIG. 8(f)

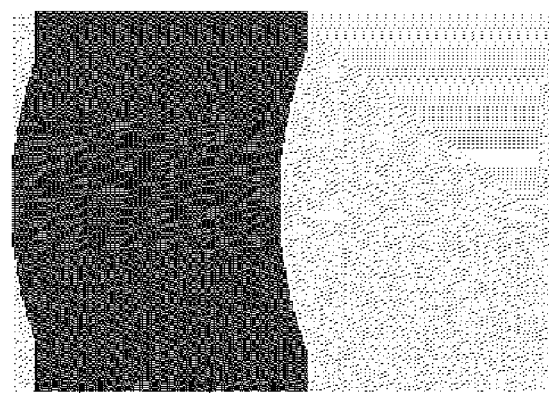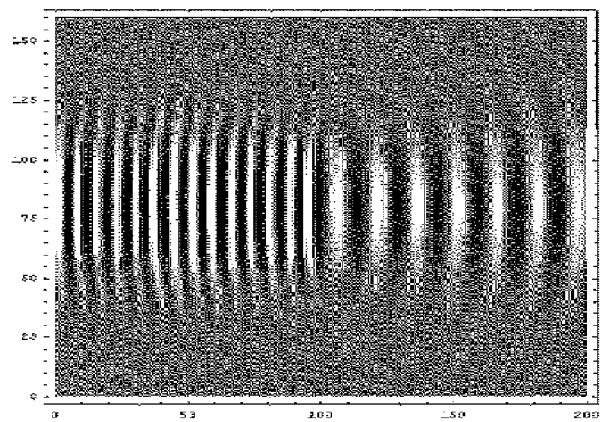
FIG. 8(g)

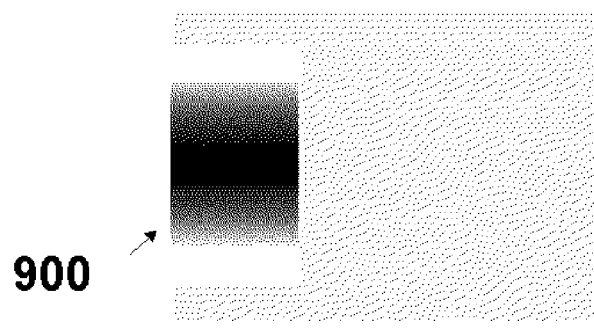 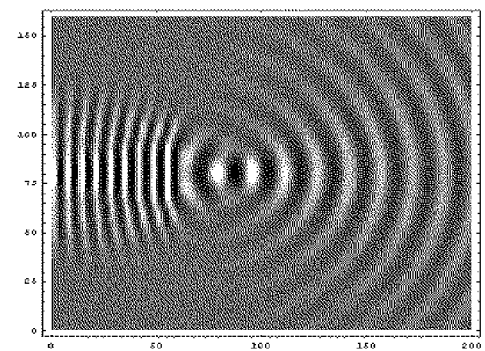
FIG. 9(a)
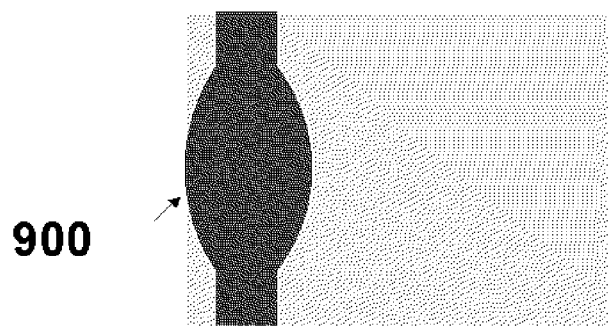 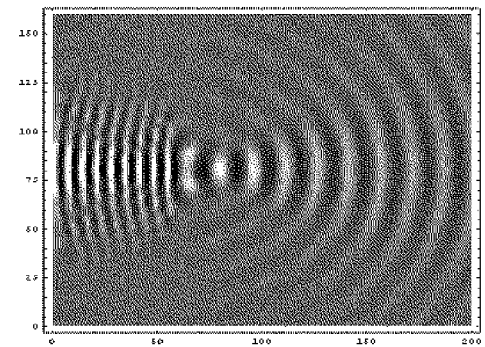
FIG. 9(b)

SUPERLENS AND A METHOD FOR MAKING THE SAME

The present patent document claims the benefit of the filing date under 35 U.S.C. §119(e) of U.S. Provisional Patent Application Ser. No. 60/454,806, filed on Mar. 14, 2003.

CROSS REFERENCE TO RELATED APPLICATIONS

This application is related to U.S. patent application Ser. No. 10/083,674, "Integrated Planar Composite Coupling Structures for Bi-directional Light Beam Transformation Between a Small Mode Size Waveguide and a Large Mode Size Waveguide," filed Oct. 22, 2001, in the names of Yan Zhou and Seng-Tiong Ho, the disclosure of which is incorporated herein by reference. This application is also related to a pending U.S. Patent Application filed with U.S. patent application Ser. No. 10/651,372, entitled "Optical Beam Transformer Module for Light Coupling between a Fiber Array and a Photonic Chip and the Method of Making the Same," filed in the names of Yan Zhou, Shide Cheng and Seng-Tiong Ho, the disclosure of which is incorporated herein by reference. This application is also related to a pending U.S. Patent ApplicatPatent Application filed with U.S. patent application Ser. No. 10/652,269, entitled "Varying Refractive Index Optical Medium Using At Least Two Materials With Thicknesses Less Than A Wavelength", filed in the names of Yan Zhou and Seng-Tiong Ho. All of the patents, patent applications, and references in this patent application (including those above) are incorporated by reference in their entirety for all purposes.

BACKGROUND OF INVENTION

The present invention relates to structures that enable electromagnetic beam transformation or spot size conversion between a large-mode-size and a small-mode-size, and methods of making the same. In particular, the present invention relates to optical structures having an effective Graded Refractive Index (GRIN) distribution in the vertical direction perpendicular to the optical axis of light propagation, and a lens shaped optical interface structure perpendicular to the direction of light propagation.

In photonics chip industry, one of the basic processes is the transformation of a light beam from a large size to a small size (or vice versa) between two optical waveguides of different mode sizes. However, the light coupling efficiency between the two optical waveguides involved in this basic process is generally low. There are a few commonly used approaches in the present state of the art to make a lens structure that addresses the above needs.

One approach involves using the property of light refraction at an optical interface. By making an optical medium such as a glass into a certain shape such as a ball or sphere, a lens can be made to focus a light beam. U.S. Pat. No. 6,026,206, titled "Optical coupler using anamorphic microlens", is an example of one such approach.

Another approach to address the needs is to create a GRIN distribution of an optical medium. Due to the GRIN distribution, the light beam bends as it travels inside the medium. This property is used in achieving light focusing. A commonly used example is an axially symmetric GRIN rod lens, which is used for collimating a light beam emitted from a single mode fiber. U.S. Pat. No. 6,267,915, titled "Production Method for Objects with Radially-Varying Properties" U.S. Pat. No. 6,128,926, titled "Graded Index Lens for Fiber Optic Applications and Technique of Fabrication" and U.S. Pat. No. 6,172,817, titled "Graded Index Lens for Fiber Optic Applications and Technique of Fabrication", are a few examples of this approach.

For coupling of light between a single mode fiber and a semiconductor waveguide based device (such as a semiconductor laser), the most commonly used coupling optics is a lensed fiber. Such a lensed fiber is made by shaping the end of the fiber into a hemispherical or cylindrical lens using lapping and polishing and/or melting means. U.S. Pat. No. 5,845,024, titled "Optical fiber with lens and method of manufacturing the same", and U.S. Pat. No. 6,317,550, titled "Lensed optical fiber" elaborate upon such optical fiber with lens.

However, there are a few problems associated with the above-mentioned lenses. For a symmetric lens element, such as a GRIN rod lens, or a ball lens or a tapered conical lensed fiber, the focused mode profile from a circular optical fiber is circular. As a semiconductor waveguide almost always has an elliptical mode profile, there is a large mode mismatch, which inherently results in low light coupling efficiency. Thus, the coupling efficiency for coupling light between a single mode fiber and a semiconductor waveguide based device cannot be very high. In fact, the coupling efficiency is only as high as about 80% for such lenses.

For reducing the problem of mode mismatch and subsequently increasing light coupling efficiency, wedge fibers can be used. There are generally two kinds of wedge fibers: single wedge fiber and double wedge fibers. Single wedge fibers have an elliptical focused beam spot with the long horizontal axis spot size basically equal to that of the circular single mode fiber spot size. However, as the horizontal axis mode spot size of a semiconductor waveguide (such as a laser diode) is typically only about 3 to 4 µm, and the beam spot size of a single mode fiber is about 6 to 10 µm, there remains a mismatch in the horizontal mode size. A double wedge fiber addresses the problem of mismatch in horizontal mode size. Using a double wedge fiber, the horizontal mode size can be made to match that of a semiconductor waveguide. However, the vertical spot size cannot be made to match with that of a semiconductor waveguide.

The above disadvantage of vertical spot size mismatch is present in all optical-interface-refraction based lenses (including those described above). This is due to the fact that the minimum vertical spot size for these lenses is about 1.5 µm (for the near infrared optical communication spectrum region) while the typical vertical mode size of a semiconductor waveguide is about 1 µm. In addition, for these lenses, especially lensed fibers, there is a large variation in the radius of curvature of the lens because each lens is made individually one at a time through processes, such as arcing or laser melting, that cannot guarantee high precision consistency. Thus, all the above-mentioned lenses will have a relatively low coupling efficiency, and there is a low consistency in the coupling efficiency.

Thus, what is needed in the photonics chip packaging industry is a superlens that can provide a focused beam spot size, and can independently achieve horizontal and vertical phase and/or wave-front matching with those of a semiconductor waveguide. In addition, the vertically focused spot size must be of the order of about 1 µm in order to match with that of a typical semiconductor waveguide. Only by doing so can a light coupling efficiency well above 80% become practically achievable.

SUMMARY OF INVENTION

It is a general aim of the invention to provide a superlens that can control the size and the phase of an electromagnetic beam.

It is a general aim of the invention to provide a superlens that can independently control vertical and horizontal focusing.

It is an aim of the invention to increase the light coupling efficiency.

It is an aim of the invention to provide a superlens whose thickness can be varied in order to achieve the desired vertical focus.

It is an aim of the invention to provide a superlens whose radius of curvature can be varied in order to achieve the desired horizontal focus.

It is an aim of the invention to produce a vertically focused spot size of at least of the order of 1 µm.

It is an aim of the invention to provide a superlens for coupling a light beam between an optical fiber and a semiconductor waveguide based device.

It is a further aim of the invention to provide a superlens that can reduce the spot size of a light beam used for optical storage thereby increasing the optical storage density. It is a further aim of the invention to provide a superlens that can be used in near-field optics in order to improve the transmission efficiency.

In order to attain the abovementioned aims, the present invention provides a superlens that has a vertically Graded Refractive Index (GRIN) distribution in a multi-layered structure. The superlens also has one or more horizontally curved sidewalls. The GRIN distribution of the superlens enables it to independently control the vertical focus of an electromagnetic beam, while the horizontally curved sidewalls enable the superlens to independently control the horizontal focus of the electromagnetic beam.

The vertical focus of the electromagnetic beam is controlled by controlling the thickness of the superlens. By changing the thickness, the output light beam can be made convergent or divergent. In a preferred embodiment, the thickness is controlled by photolithography and etching.

The horizontal focus of the electromagnetic beam is controlled by controlling the radius of curvature of the sidewalls. In a preferred embodiment, the radius of curvature is controlled by photolithography and etching.

BRIEF DESCRIPTION OF DRAWINGS

The preferred embodiments of the invention will hereinafter be described in conjunction with the appended drawings provided to illustrate and not to limit the invention, wherein like designations denote like elements, and in which:

FIG. 3 (a) shows ray optics picture of focusing a parallel light beam using a lens and FIG. 3 (b) shows computer simulated wave picture of focusing a parallel light beam using a lens;

FIG. 6 (a) shows a computer simulation of vertical focusing pure graded refractive index distribution to a focal length or a quarter of the pitch of the GRIN medium and FIG. 6 (b) shows a computer simulation of horizontal focusing a convex cylindrical input surface or sidewall;

FIG. 7 shows computer simulation of vertical focusing (a) when the GRIN medium thickness is equal to 16 µm, which is just a quarter of the pitch of the GRIN distribution, (b) when the GRIN medium thickness is equal to 14 µm; (c) when the GRIN medium thickness is equal to 12 µm, (d) when the GRIN medium thickness is equal to 10 µm, (e) when the GRIN medium thickness is equal to 8 µm, (f) when the GRIN medium thickness is equal to 6 µm and (g) when the GRIN medium thickness is equal to 4 µm;

FIG. 8 shows horizontal cylindrical lens and their corresponding horizontally focused beam spot sizes for varying dimensions: (a) thickness T=10 µm, first radius R1=8 µm, second radius R2=8 µm, (b) thickness T=10 µm, first radius R1=10 µm, second radius R2=10 µm, (c) thickness T=10 µm, first radius R1=12 µm, second radius R2=12 µm, (d) thickness T=10 µm, first radius R1=14 µm, second radius R2=14 µm, (e) thickness T=10 µm, first radius R1=16 µm, second radius R2=16 µm, (f) thickness T=10 µm, first radius R1=18 µm, second radius R2=18 µm and (g) thickness T=10 µm, first radius R1=20 µm, second radius R2=20 µm;

FIG. 9 (a) shows computer simulation of vertical focusing when a strong focusing GRIN medium (with $n_0$=2.2 and $n_b$=1.5) has a thickness of 6 µm and FIG. 9 (b) shows computer simulation of horizontal focusing of a bi-convex cylindrical lens with refractive index n=2.2, first radius of curvature R1=10, second radius of curvature R2=−9 and lens thickness T=6 µm.

DETAILED DESCRIPTION

The present invention provides an apparatus that can control the size and the phase of an electromagnetic beam, and can independently focus it in the horizontal and vertical directions. The present invention also describes a method to create such an apparatus. To improve the understanding of the present invention, fundamental concepts related to the invention are herein described.

Fundamental Concepts: An electromagnetic wave is characterized by a wavelength and a frequency with which it oscillates. Further, the electromagnetic wave travels at a speed that depends on the medium through which it is traveling. The speed of the electromagnetic wave decreases as it travels from vacuum to a medium. The ratio of the speed of electromagnetic wave in vacuum (c) and the speed in the medium (v) is a property of the medium and is referred to as the refractive index (n) of the medium.

When the electromagnetic wave travels through a medium, the frequency of the electromagnetic wave is unchanged while the wavelength is reduced from $\lambda_o$ in vacuum to $\lambda_{eff} = \lambda_o / n$ in the dielectric medium.

Figure 1:
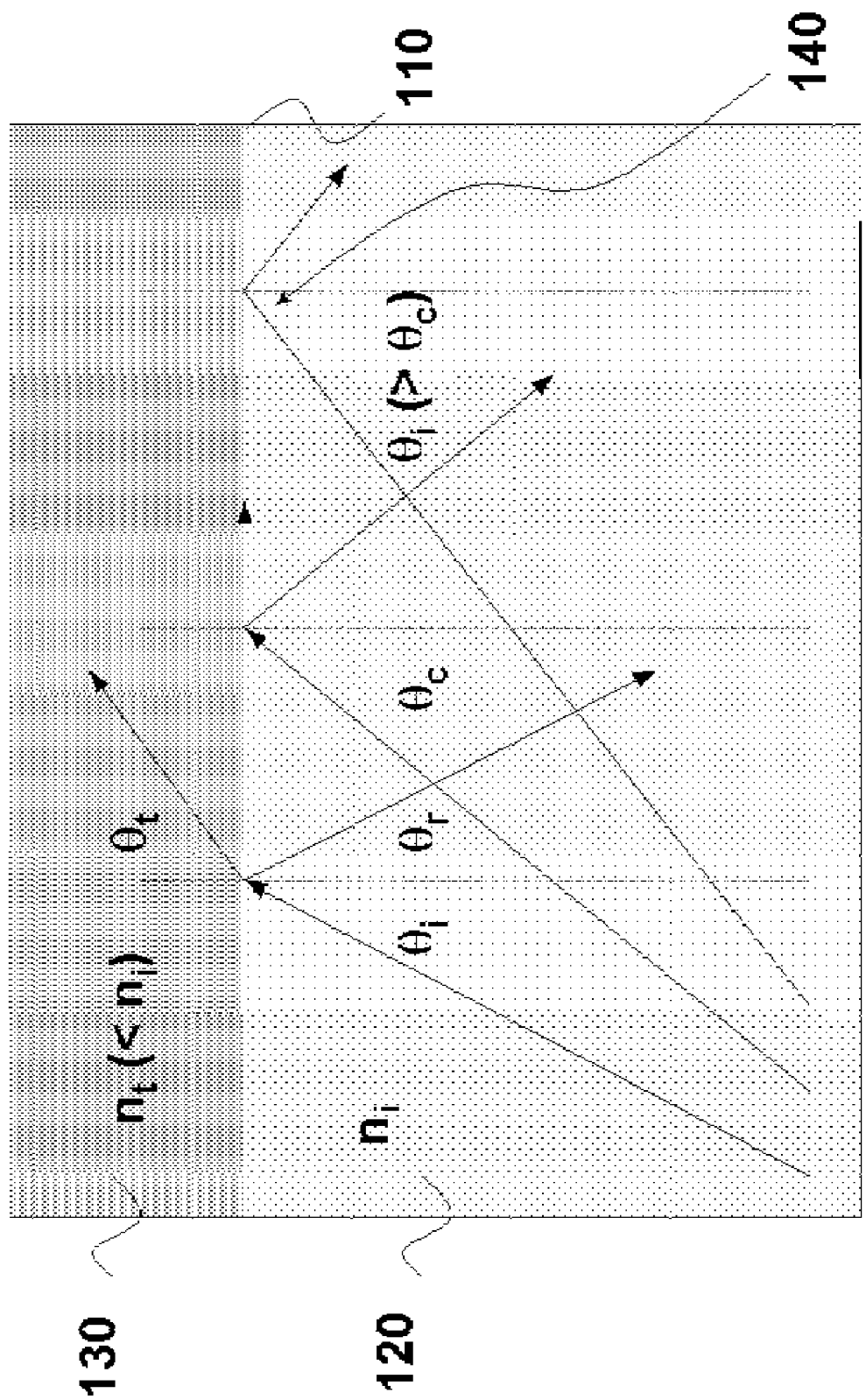
FIG. 1 illustrates the concept of light reflection, refraction and total internal reflection at an optical interface.

Electromagnetic wave can be assumed to be a ray traveling in a straight line within a medium of the same refractive index if the size of the medium (such as a lens) is much greater than (about ten times) the wavelength of the electromagnetic wave. The electromagnetic wave undergoes refraction as well as reflection when it travels from one medium to the other medium. For example, FIG. 1 shows an optical interface 110 between two media 120 and 130. Medium 120 has refractive index $n_i$ and medium 130 has refractive index $n_r$. An electromagnetic wave ray is reflected back into the first medium 120 and also refracted/transmitted into the second medium 130. According to the law of reflection, the angle of incidence ($\theta_i$) of the incident electromagnetic wave ray equals the angle of reflection ($\theta_r$) of the reflected electromagnetic wave ray. Further, Snell's law of refraction states that the refraction angle ($\theta_t$) is related to the incidence angle ($\theta_i$) through the equation $$n_i \sin \theta_i = n_r \sin \theta_t$$

Figure 2:
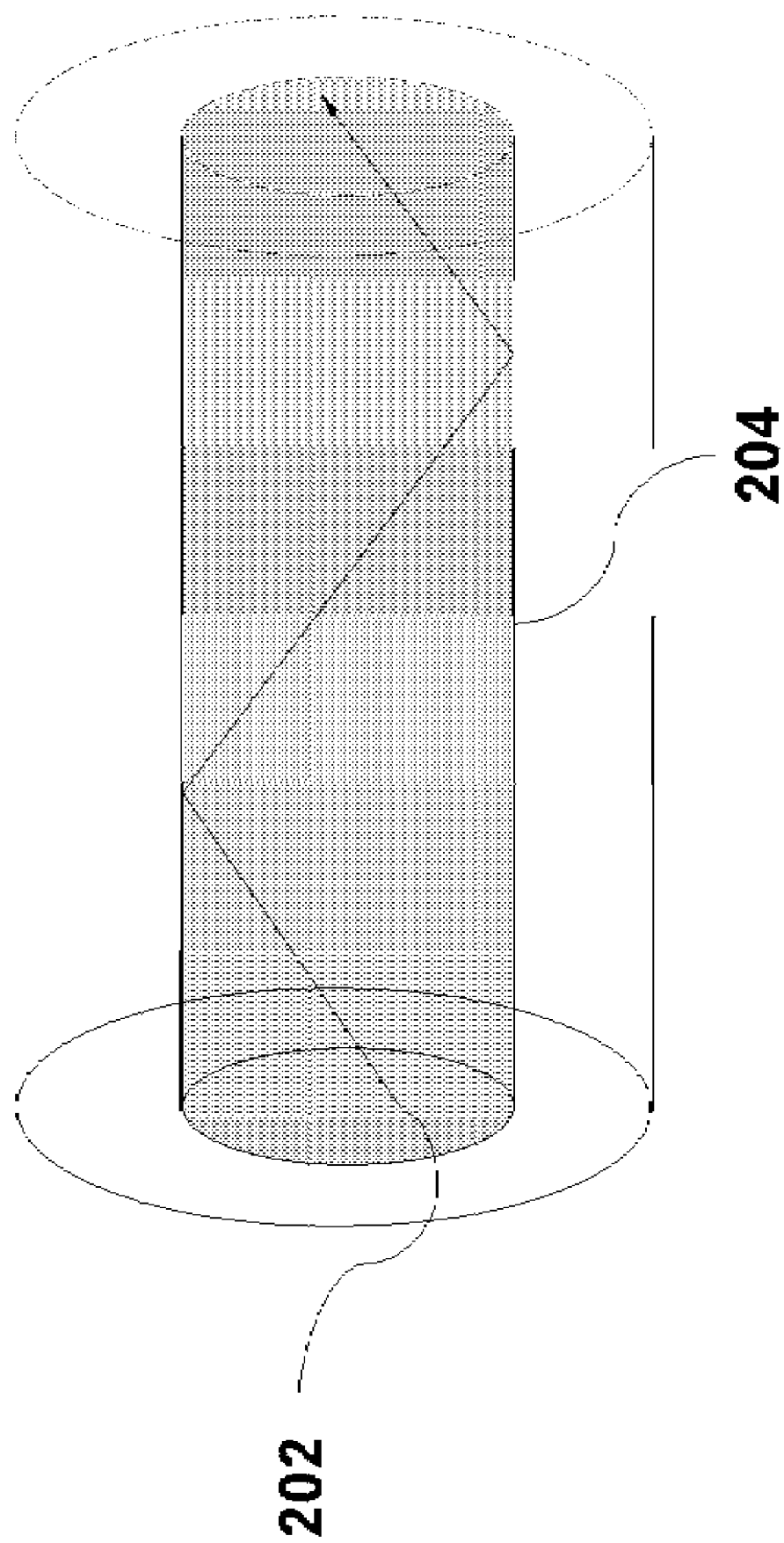
FIG. 2 shows the manner in which light is guided in a step refractive index waveguide, such as an optical fiber, through successive total internal reflection.

However, if $n_i > n_r$, as $\theta_i$ increases to a particular value called the critical angle, $\theta_t$ will reach 90°, and afterwards, the incident electromagnetic ray is totally reflected as is shown for electromagnetic ray 140. This phenomenon is referred to as total internal reflection. The concept of total internal reflection is used in various practical applications. For example, total internal reflection is used to guide electromagnetic wave through a step refractive index optical waveguide or fiber as shown in FIG. 2. In FIG. 2, incident electromagnetic wave 202 strikes the wall of optical waveguide 204 at an angle that is greater than the critical angle for the optical waveguide. Hence, the electromagnetic wave undergoes total internal reflection resulting in the transmission of the electromagnetic wave through the waveguide.

An optical interface between two media can be shaped into a curved surface. The curved surface so generated is also referred to as lens. For example, FIG. 3 (a) shows a lens 310 that is constructed by shaping an optical interface into a convex or concave curved surface form. A parallel beam of electromagnetic wave can be regarded as being made up of a number of parallel rays 320. As shown in FIG. 3 (a), curved surface lens 310 can be made to enable parallel incident rays 320 to focus to a single point 330 in space. This is because the outer rays are refracted more than the central rays as governed by Snell's law of refraction so that all the rays converge to one point.

However, Snell's law is based on the assumption that the electromagnetic wave has infinite wavelength. In reality, an electromagnetic wave has a finite wavelength, hence the focused electromagnetic wave beam cannot have an infinitely small spot size but a finite spot size. For example, FIG. 3 (b) shows a computer simulation of a focusing lens based on the wave theory and it can be seen that the focused electromagnetic wave beam has a limited spot size 340 with a certain intensity distribution.

Figure 4:
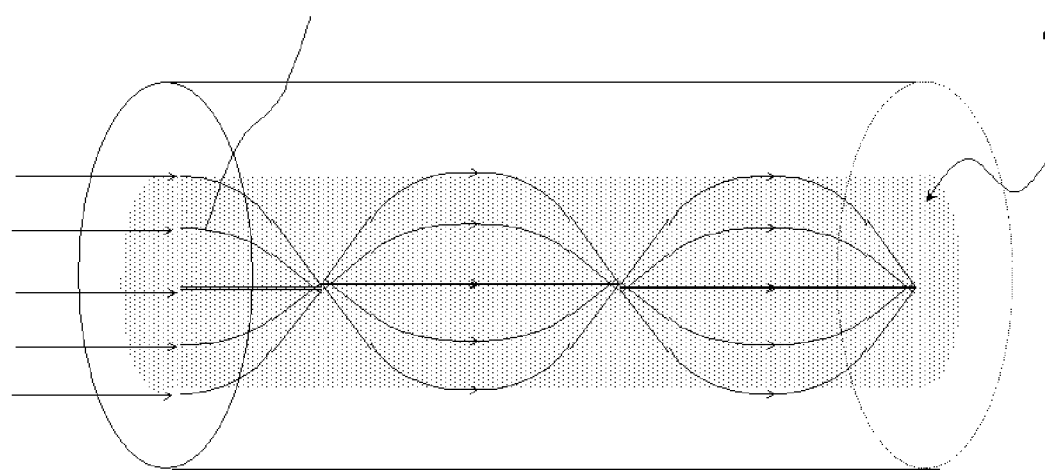
FIG. 4 shows ray optics picture of light beam propagation in a graded refractive index ("GRIN") optical medium.

The refractive index of a medium can be constant or varying from one point in the medium to the other. For example, FIG. 4 shows a graded refractive index ("GRIN") optical medium 400. The material of GRIN optical medium 400 has refractive index n(r) that decreases continuously from a value of $n_0$ at the central axis (r=0) to a value of $n_b$ at the outside border (r=a). The distance r=a is defined as the distance from the central axis to the border of the GRIN medium. In this example, n(r) has a parabolic refractive index distribution given by the formula:

$$n(r) = n_0[1 - \Delta(r/a)^2]$$

$$\Delta = (n_0 - n_b)/n_0$$

This refractive index distribution causes electromagnetic wave rays 410 propagating longitudinally through GRIN optical medium 400 to bend towards the central axis and to be periodically refocused. If GRIN optical medium 400 is cut to the right length, the GRIN optical medium 400 can function as a lens to focus or expand and collimate a beam of electromagnetic wave. The focal length (f) (also called a quarter of the pitch) of such a GRIN medium is approximated by the following formula.

$$f = a\pi/(2\sqrt{2\Delta})$$

As described above, the focused point or spot for electromagnetic wave beam or pulse has a finite size. Given the aperture of a GRIN lens r=a, the shorter the focal length, the smaller is the focused spot size. Accordingly, in the case of GRIN medium 400, a smaller focused spot size can be achieved by increasing $\Delta$ (which is dominated by the index difference between the central axis and the end point of the lens). However, there is a physical limit to which the spot size can be reduced. This limit referred to as the diffraction limit states that the smallest focused spot size of any electromagnetic wave is about the size of the wavelength in the medium where the focusing occurs. In the case of a GRIN lens, the focused electromagnetic wave beam is located near the central axis, where the refractive index is the highest. Hence, if a high refractive index material is used at the central axis, a much smaller diffraction-limited beam spot size can be achieved because the wavelength of light in a material is equal to the vacuum wavelength divided by the refractive index of that material.

Figure 5A:
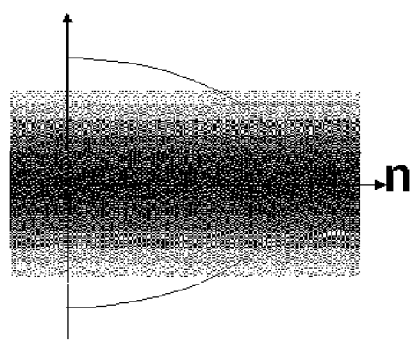
FIG. 5 (a) shows side view of vertically graded refractive index distribution and computer simulation of vertical focusing, FIG. 5 (b) shows top view of horizontally curved surface lens and computer simulation of horizontal focusing and FIG. 5 (c) shows a three-dimensional view of the invented lens structure.
Figure 5B:
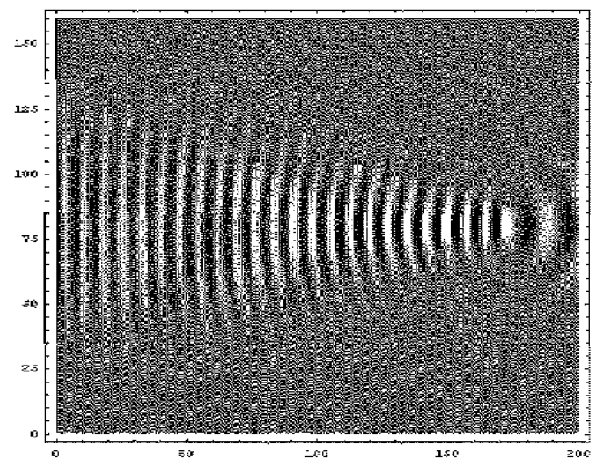
Figure 5C:
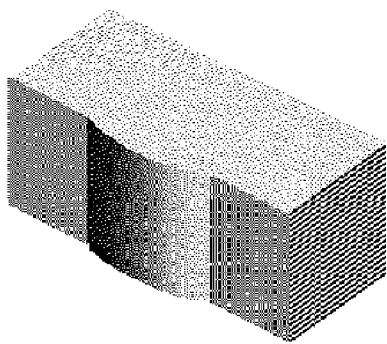

Embodiments of the present invention: A preferred embodiment of the present invention describes an apparatus that combines a vertically GRIN multi-layer structure with a curved sidewall surface lens structure. This combination creates a two dimensional lens that can independently focus an electromagnetic wave beam in the vertical and horizontal directions. In a preferred embodiment, the electromagnetic wave beam is a light beam. The combined structure is hereon referred to as superlens. FIGS. 5 (a), 5 (b) and 5 (c) show a preferred embodiment of the superlens. FIG. 5 (a) shows the side view of a vertically GRIN lens structure. FIG. 5 (b) gives the top view of the preferred horizontally curved surface cylindrical lens structure, and FIG. 5 (c) shows a 3-dimensional view of the preferred lens structure.

The superlens, in accordance with a preferred embodiment of the present invention, is used for simultaneous focusing of a light beam to the same focal plane along the optical axis in both the vertical direction and the horizontal direction. Independent control for focusing the light beam also allows a user to offset the vertical and horizontal focal planes. Further, the superlens allows the user to control the phase or wavefront of the incident light beam in such a way that the focused light beam can be deliberately made properly astigmatic. This is used to match desired off set for some channel optical waveguide devices, such as some semiconductor lasers for which the vertical and horizontal beam waists are not at the same location along the optical axis. The method to control vertical and horizontal focusing is further described using FIG. 6 (*a*) and FIG. 6 (*b*).

FIG. 6 (*a*) and FIG. 6 (*b*) respectively show computer simulation of vertical focusing a pure GRIN distribution and horizontal focusing a convex cylindrical input surface or sidewall. For the sake of illustration, it is assumed that superlens 600 has a height of 12 μm and a width of 12 μm. Further, the light beam is circular in shape and has a diameter of 10 μm. The diameter of the light beam corresponds to a typical mode size of a standard single mode optical fiber at a wavelength of 1.55 μm in vacuum. Thickness of superlens 600 is assumed to be 16 μm, which is equal to the focal length of the vertical GRIN medium. This ensures that a parallel beam incident on superlens 600 is vertically focused with the vertical focal plane substantially close to the output or exit optical interface. Note that the example is chosen only for the purpose of illustration, and in no way should it be construed as limiting the scope of the invention, which, in turn, is determined by the appended claims.

Horizontal focusing superlens 600 is done by creating a horizontal curved sidewall on the input side of superlens 600. The curved surface can be of various forms such as cylindrical, spherical, aspherical and toric. In a preferred embodiment, convex cylindrical curved surface is used for the superlens. Further, the horizontal and vertical focusing is done in a common focal plane by proper selection of radius of curvature $R_1$ of the cylindrical curved surface.

A feature of the horizontal and vertical focusing is that the depth of focus for the horizontal focusing is larger than that for the vertical case. This is because the vertical focusing power is higher than the horizontal one or the vertically focused spot size is smaller than the horizontal one.

The method of vertical and horizontal focusing is now further described. For the sake of illustration, assume that superlens 600 has a GRIN distribution $n(r)=n_0[1-\Delta(r/a)^2]$, where $\Delta=(n_0-n_b)/n_0$, $\delta=n_0-n_b$ and vertical focal length (f) is $f=a\pi/(2\sqrt{2\Delta})$. Possible methods to independently control the spot size vertically as well as horizontally are described herein after.

One simple method to adjust the vertical focused spot size to a large value is to etch superlens 600 to a smaller total thickness (also called length) so that electromagnetic beam focusing occurs in the next uniform optical medium. In most practical cases, the next uniform optical medium is air with a refractive index of one. This method is further described using FIG. 7 (*a*) to FIG. 7 (*g*).

FIG. 7 (*a*) to FIG. 7 (*g*) show the computer simulation of an exemplary vertical GRIN medium with refractive index distribution $n(y)=2.05\ 0.3(y/6\ \mu m)^2$ with various total thickness and the computer simulation of light beam focusing for each case. This distribution is chosen only for the purpose of illustration, and there are numerous other distributions that achieve the same result. The parallel circular input light beam size is assumed to be 10 μm, which corresponds to the typical mode size of a standard single mode optical fiber. FIG. 7 (*a*) to FIG. 7 (*g*) show that with the reduction of the total length or thickness of the vertically GRIN medium from 16 μm to 4 μm, the vertically focused light beam spot size is monotonically increased. Additionally, the focal plane is also moved towards the input side of the GRIN medium.

There is a practical limit to the smallest total thickness of the lens and as photolithography is used to make a dry etch mask, a reasonable thickness limit is about 4 μm. Since the vertically focused spot size increases as the lens thickness decreases and also there is a limit to the practical lens thickness, one method to enhance the range of vertically focused spot size is to come up with a few standard vertically GRIN distribution. Some of the distributions have very strong focusing power and others have less focusing power. Further, each GRIN distribution is etched into different lens thickness. For example, to cover a range of vertical spot size from 1 μm to 5 μm, two standard GRIN distributions are such that one has a smallest focused spot size of 1 μm and the other has a smallest focused spot size of 3 μm. Additionally, in FIG. 7 (*a*) to FIG. 7 (*g*), along with the decrease in the GRIN medium thickness, the focused spot size can actually be controlled to vary from around 1 μm to around 3 μm.

While vertical focusing is controlled by controlling thickness of the superlens, horizontal focusing is controlled by giving proper shape to the curved sidewall. This control involves design and etching of the curved input and output sidewalls to adjust the sidewall surface profile. In one preferred embodiment, the design should be such that the horizontal focal plane coincides with the vertical focal plane and the horizontal focused spot size can be controlled to a desirable value. The method to control horizontal spot size is further explained using FIG. 8 (*a*) to FIG. 8 (*g*).

FIG. 8 (*a*) to FIG. 8 (*g*) corresponds to the case of FIG. 7 (*d*) in which the vertical GRIN medium has a thickness of 10 μm and the vertical focal plane is located at about 12 μm from the input side. Horizontal focusing is a function of the radius of curvature of the input and output cylindrical sidewalls. In a preferred embodiment of the present invention, first radius R1 of the input cylindrically convex surface is designed to be equal to second radius R2 of the output cylindrically concave surface. By keeping the two radii of curvature of the two sidewalls substantially equal to each other but with the first one convex and the second one concave, the focal plane is more or less maintained at the same location of about 12 μm from the input side of the superlens. FIG. 8 (*a*) to FIG. 8 (*g*) show that as the radius of curvature of the horizontally cylindrical sidewall is increased, the focused electromagnetic beam size also increases.

A point to note is that in the computer simulation the refractive index of the superlens medium is assumed to be equal to 2.05, which is the center refractive index of the assumed GRIN distribution. Central refractive index is chosen over the average refractive index for the GRIN distribution. This is because most of the optical energy of a Gaussian electromagnetic beam (this is the case for an electromagnetic beam in an optical fiber or in a semiconductor channel waveguide) is located in the central region. Secondly, since the GRIN distribution is assumed parabolic, a major part of the GRIN distribution has a refractive index that is close to the central refractive index.

Further, the vertically central portion of the beam is horizontally focused more strongly than the vertical non-border portion of the beam. This is due to the difference of the refractive index in the vertical direction as one move from the central axis to the border. This slight deviation causes the focused electromagnetic beam not to be perfectly Gaussian in the horizontal direction. However, the computer simulation shows that the influence to the overall light coupling efficiency is minimum once the mode size and phase is matched for the central portion of the light beam. In an alternative embodiment, this problem can be overcome by etching the input and the output sidewalls of the lens into a three dimensional curved surface such that along with the departure from the vertical central region of the GRIN distribution, the horizontal radius of curvature is made to have a smaller value gradually to balance out the effect of the refractive index decrease. This ensures that the vertical border portion of the electromagnetic beam is focused by the same amount as the vertical central portion of the beam.

In a preferred embodiment, the input sidewall is taken to be convex and output sidewall to be concave. However, the above method for horizontal and vertical focusing can also be applied for other shapes of sidewalls. Further, if the thickness of the superlens is very small, the present invention also achieves a relatively small horizontal focused spot size and at the same time keeps the horizontal focal plane to coincide with the vertical focal plane. This feature is further highlighted using the example described using FIG. 9 (a) and FIG. 9 (b).

Figure 9C:
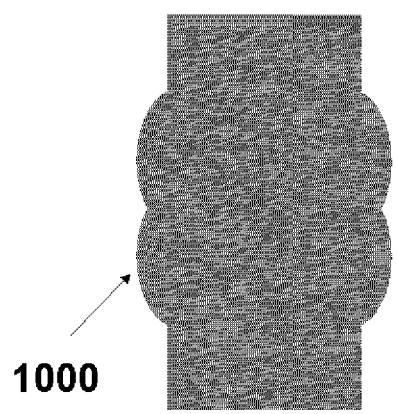
FIG. 9(c) shows an arbitrary curved surfaces to realize arbitrary phase and intensity profile transformation in the horizontal direction for the input beam.
Figure 9D:
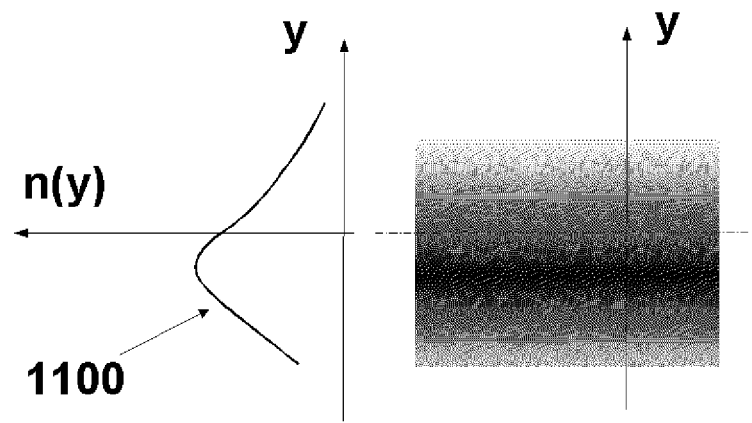
FIG. 9(d) shows an arbitrary refractive index profile in vertical direction.
Figure 10A:
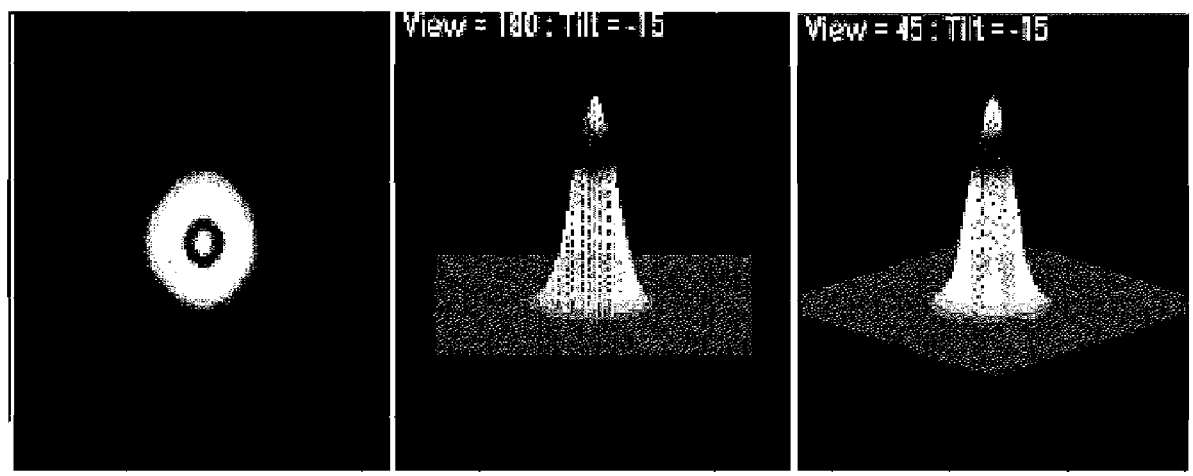
FIG. 10 shows measured focus spot sizes along with the corresponding optical device: (a) size of about 10 µm by 10 µm from a standard single mode fiber, (b) size of about 4 µm by 10 µm from a wedge fiber, (c) size of about 4 µm by 3.5 µm from a conical lensed fiber, (d) size of about 1 µm by 4 µm from our superlens and (e) size of about 1 µm by 3.5 µm from a semiconductor laser.
Figure 10B:
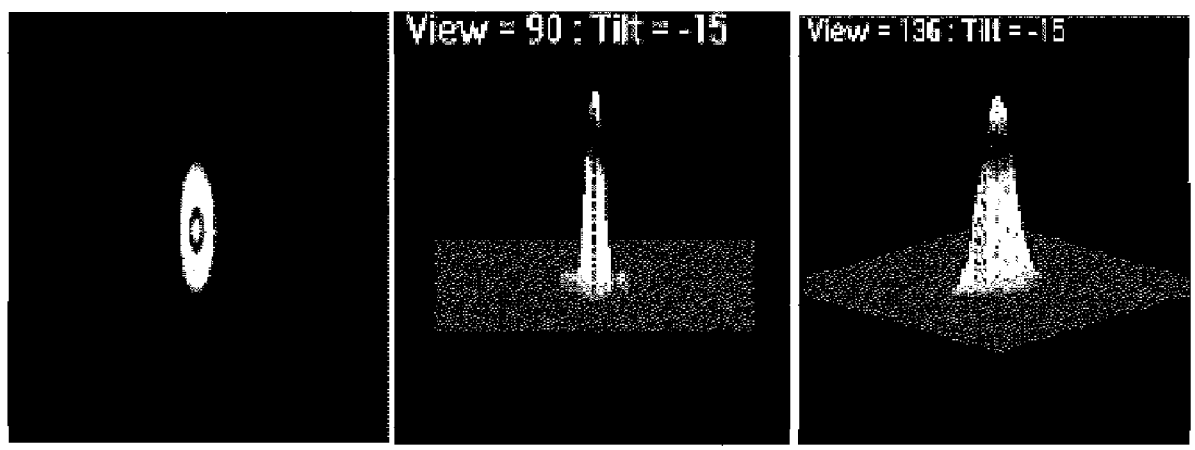
Figure 10C:
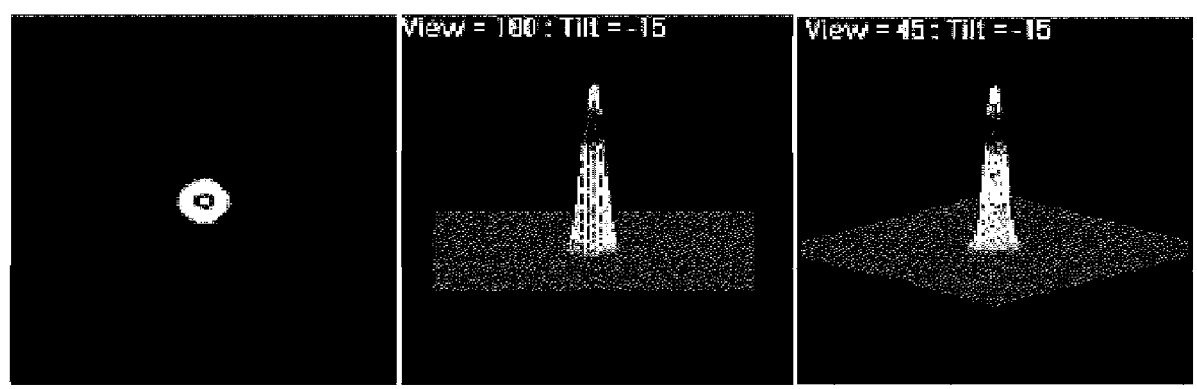
Figure 10D:
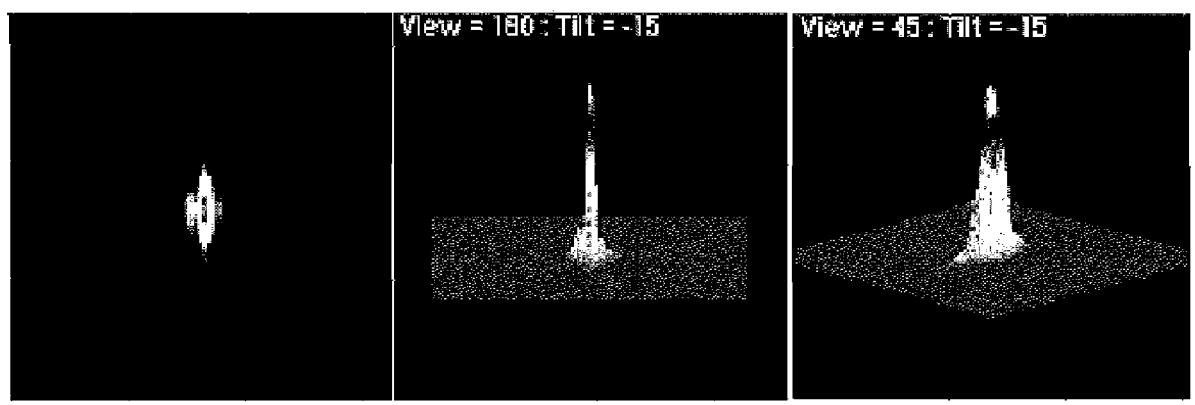
Figure 10E:
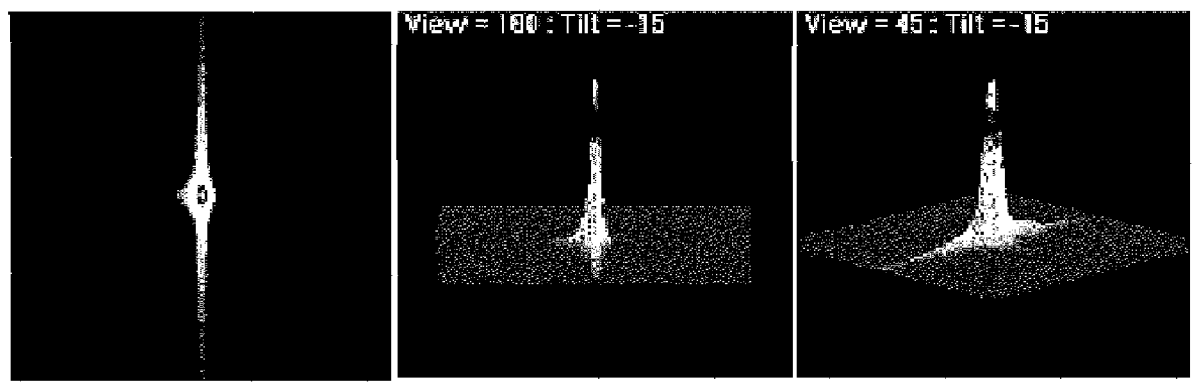

The example in FIG. 9 (a) and FIG. 9 (b) show an alternate embodiment of a superlens 900 that has convex input and output sidewall. In FIG. 9 (a), the vertical parabolic GRIN medium has a relatively strong focusing power with refractive index at the center $n_0$=2.2 and refractive index at the border $n_b$=1.5 and the thickness of the lens T=6 µm. The vertical focal plane is located in air at about 8.5 µm from the input side of the superlens. FIG. 9 (b) shows the horizontal structure of superlens 900 and the computer simulation of light propagation. The assumed values for the horizontal superlens curved surface are: refractive index n=2.2, first radius of curvature R1=10, second radius of curvature R2=-9 and superlens thickness T=6 µm. The computer simulation in FIG. 9 (a) and (b) shows that the 10 µm wide parallel incident light beam can be made to focus horizontally at the same distance from the input surface as that for the vertically focused beam. This example shows that in addition to the vertically GRIN distribution, both the first or input sidewall and the second or output sidewall can be made to have different sidewall surface profiles to cater for various requirements and applications.

The method of horizontal and vertical focusing described above allows transformation of an electromagnetic beam to various circular or elliptical or other desirable intensity profiles Further, the method also caters to various phase matching needs. For example, in the case of beam size transformation from a single mode fiber to a semiconductor channel waveguide, the vertically focused beam size can be controlled to vary from 0.5 µm to 10 µm and the horizontally focused beam size can be controlled to vary from 2 µm to 10 µm. Such a wide range is beneficial to the current photonics chip packaging industry simply because other lenses known in the art cannot focus a light beam to less than 1.5 µm in the vertical direction and the required vertically focused beam size is about 1 µm which can be easily achieved with the invented superlens. As the horizontal curved surfaces are defined by lithography and etching, arbitrary curved surfaces can be formed to realize arbitrary phase and intensity profile transformation in the horizontal direction for the input beam. An example of such arbitrary profile is illustrated in FIG. 9(c), wherein the front and back curve surfaces of the lens have curvilinear shape shown in 1000. Likewise, as the graded refractive index profile can be fabricated by material deposition, one method of which is described in a pending patent Ser. No. 10/652,269, entitled "Varying Refractive Index Optical Medium Using At Least Two Materials With Thicknesses Less Than A Wavelength", arbitrary refractive index profile can be formed to realize arbitrary phase and intensity profile transformation in the vertical direction for the input beam. An example of such arbitrary profile is illustrated in FIG. 9 (d), wherein the refractive index is peaked at a location below the middle of the lens with the varying refractive index profile n (y) shown in 1100.

The advantage of the present invention over the existing technology is further highlighted using FIG. 10. FIG. 10 gives a comparison of the measured light output spot size from a single mode fiber as shown in FIG. 10 (a), a wedge fiber as shown in FIG. 10 (b), a conical lensed fiber as shown in FIG. 10 (c), superlens in accordance with a preferred embodiment of the present invention as shown in FIG. 10 (d) and a standard semiconductor laser as shown in FIG. 10 (e). The focused spot size from the superlens as shown in FIG. 10 (d) matches very well with the spot size of the measured semiconductor laser while there is a relatively large mismatch for either the wedge fiber or the conically tapered lensed fiber. Further, the superlens of the preferred embodiment also achieves a coupling efficiency that is about 10 to 20% higher than the existing commercially available conical lensed fibers or wedge fibers.

In a preferred embodiment, the optical medium on the left of the superlens is assumed to be same as the optical medium on the right of the superlens. However, the optical medium on the left of the superlens can also be different from the optical medium on the right of the superlens. This optical medium may be an optical fiber. Further, there can be a small air gap between the optical fiber end face and the superlens input sidewall.

Anti-reflection coating can also be deposited on both the left and the right sidewall of the superlens to substantially reduce reflection at the two optical interfaces. For example, on the left side, if there is a small air gap between the optical fiber end face and the superlens input sidewall, then an anti-reflection coating can be deposited on both the fiber-to-air interface and the air-to-superlens interface to increase light transmission and therefore increase light coupling efficiency. Anti-reflection coating design depends on the refractive index distribution of the superlens. Hence, for the present invention, the anti-reflection coating design can be based on either the central refractive index or the average refractive index or an optimized equivalent refractive index that will lead a maximum light transmission.

The light transmission efficiency can be further improved by filling the air gap with a third optical medium. Such a medium can be properly selected to have a refractive index that matches the fiber core refractive index. The matching of refractive index between the fiber core and third optical medium ensures that there is only one optical interface between the fiber core and the superlens material. The anti-reflection coating can then be properly designed to maximize light transmission across this interface.

Similarly, on the right side of the lens, a semiconductor waveguide can be butt-joined to the superlens with a tiny air gap. Again, anti-reflection coatings can be deposited on either the superlens sidewall, or the semiconductor end face (depending on whether this is needed) or on both surfaces. In a similar way, the air gap can be filled with another optical medium, which may or may not need to serve any index matching purposes. For example, a fiber can be placed on the left side of the superlens and a photonic chip on the right side of the superlens. In this case both the left air gap and the right air gap are filled with the same optical medium such as an optical gel or a transparent optical polymer that is refractive index matched to the fiber core. The anti-reflection coating can then be deposited on the required surfaces to maximize light transmission.

Apart from the embodiment of the present invention described above, various variations of the present invention are also possible.

The GRIN distribution is not limited to parabolic distribution. The invention works for any arbitrary distribution. For example, a proper choice of the GRIN distribution (not necessarily parabolic) can used to match a focused light intensity profile that is not Gaussian. Further, the electromagnetic wave spectrum covers all wavelength regions such as visible, infrared, Radio Frequency (RF), TeraHertz waves.

The superlens can also be used for any electromagnetic beam size (not necessarily 10 µm beam size). For example, the electromagnetic beam size can be of the order of about 50 µm or 62.5 µm to cover the case of standard multimode fibers. The superlens structure can be accordingly changed to enable efficient light coupling between such a multimode fiber and a semiconductor waveguide device.

In the above embodiments, it has been assumed that a parallel electromagnetic beam is incident from the left and is focused in another optical medium to the right of the superlens. However, electromagnetic beam can propagate in either direction. An example of electromagnetic beam being incident from the right is the case of light coupling from a semiconductor laser to a single mode fiber. For this case, light should travel in the reverse direction i.e. from right to left.

In short, the invented superlens structure covers various wavelength, various GRIN distributions, various beam sizes and various superlens physical dimensions.

Further, total thickness of the superlens need not be less than or equal to one focal length (a quarter of the GRIN medium pitch). If the superlens has a thickness that is between one quarter and half the pitch of the GRIN medium, a parallel incident beam emerges in the vertical direction from the output surface in a divergent or collimated manner. Similarly, if the superlens has a thickness between half and three quarter the pitch of the GRIN medium, a parallel incident beam emerges from the output surface in a convergent manner in the vertical direction. Hence, the effect in vertical direction is similar to the case when the superlens thickness is within a quarter of the pitch. However, the horizontal focusing is different since the thickness has changed. This argument can be further extended to even larger values of the superlens thickness and the present invention covers all such cases. In general, for a superlens with pitch f, if the superlens has thickness between $[(2n-1)/4]f$ and $nf/2$, where n is a natural number, then a parallel incident beam emerges in the vertical direction from the output surface in a divergent or collimated manner. If the superlens has thickness between $nf/2$ and $[(2n+1)/4]f$, where n is a natural number, then a parallel incident beam emerges in the vertical direction from the output surface in a convergent manner.

This feature gives the present invention an advantage over another pending U.S. patent application Ser. No. 10/083,674, "Integrated Planar Composite Coupling Structures for Bi-directional Light Beam Transformation Between a Small Mode Size Waveguide and a Large Mode Size Waveguide", filed Oct. 22, 2001, in the names of Yan Zhou and Seng-Tiong Ho. The pending patent application achieves horizontal beam narrowing using horizontally tapered waveguide. However, due to the limitation in the tapering angle, the length of the tapering section needs to be made quite long (of the order of about 100 µm). Further, along the tapering waveguide section, there exist relatively long sidewalls on both sides of the waveguide, which cannot be made perfectly scatterless. This results in significant light propagation loss. In the present invention, in addition to the fact that the total distance of light propagation in the superlens medium can be made much less (of the order of about 10 µm), there are also no waveguide-related sidewalls, as a result, light propagation loss is substantially reduced.

The fabrication methods for the superlens structure described above exist in the prior art. The GRIN film can be deposited using a variety of well-established technologies as has been elaborated in pending U.S. patent application Ser. No. 10/083,674, "Integrated Planar Composite Coupling Structures for Bi-directional Light Beam Transformation Between a Small Mode Size Waveguide and a Large Mode Size Waveguide," filed Oct. 22, 2001, in the names of Yan Zhou and Seng-Tiong Ho, pending U.S. Patent Application filed with U.S. Patent Office on Aug. 28, 2002, File No: 021040-001100US, entitled "Optical Beam Transformer Module for Light Coupling between a Fiber Array and a Photonic Chip and the Method of Making the Same," filed in the names of Yan Zhou, Shide Cheng and Seng-Tiong Ho, and U.S. Patent Application filed with U.S. Patent Office on Aug. 28, 2002, File No: 021040-001000US, entitled "Varying Refractive Index Optical Medium Using At Least Two Materials With Thicknesses Less Than A Wavelength", filed in the names of Yan Zhou and Seng-Tiong Ho.

For example, the pending application File No: 021040-001000US, entitled "Varying Refractive Index Optical Medium Using At Least Two Materials With Thicknesses Less Than A Wavelength", filed in the names of Yan Zhou and Seng-Tiong Ho describes a method to construct the GRIN distribution using multiple thin layers of optical media with different refractive indices. The method is based on the assumption that if the layer thickness is small, there is a negligible difference in the focusing effect between a continuously GRIN distribution and a step-GRIN distribution provided by multiple thin layers of materials with different refractive indices. The pending application also mentions that by employing two (or more) materials having a relatively large refractive index difference, a structure having an effective GRIN (e.g., a parabolic distribution) can be created. Further, by using a high refractive index material and a low refractive index material, a parabolic GRIN structure can be made to have a very high focusing power. Hence the spot size of the focused electromagnetic beam can be made very small (e.g., less than 1.0 µm for electromagnetic wave having a wavelength of 1.5 µm in air).

Figure 11:
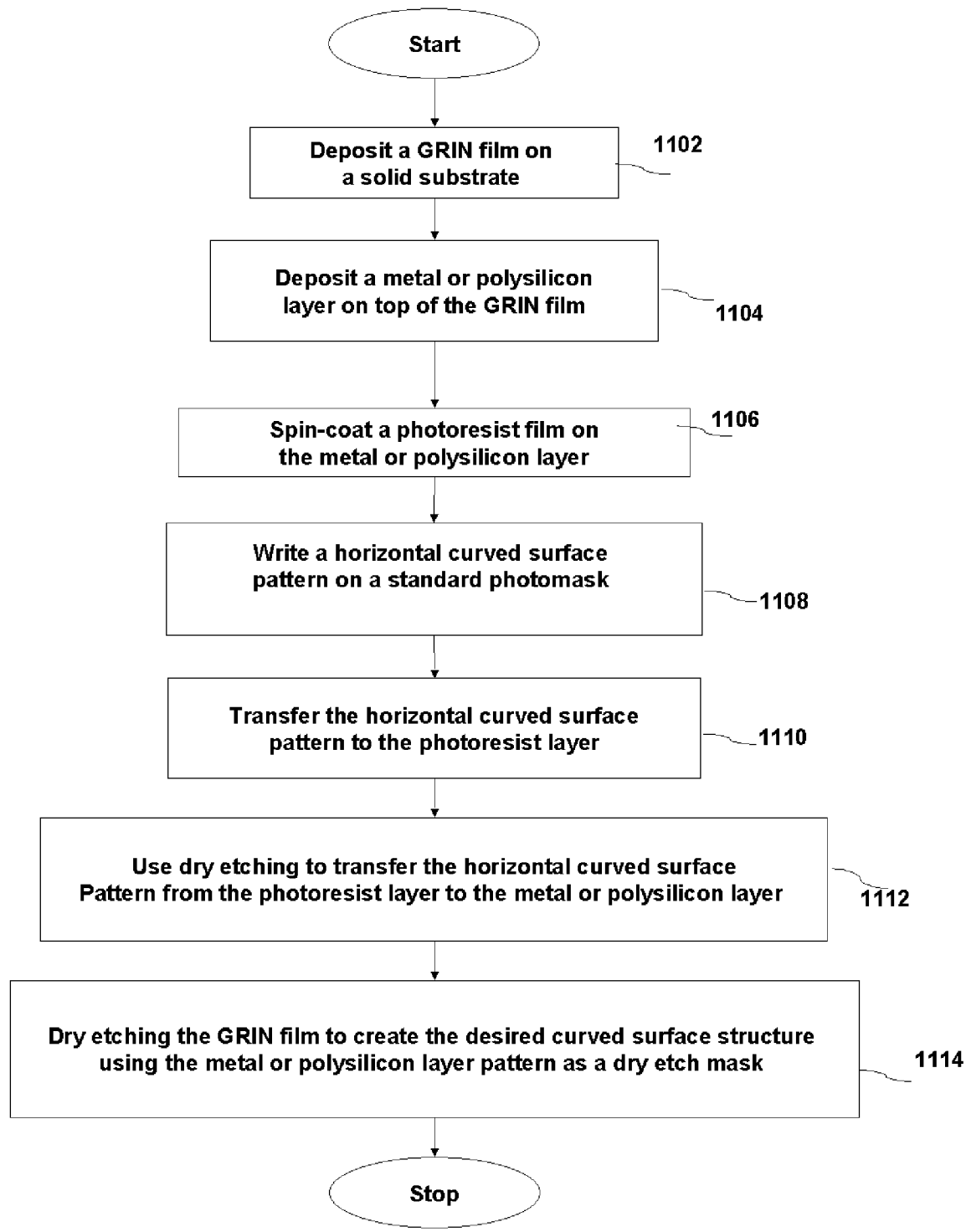
FIG. 11 is a flowchart depicting the method of fabricating the superlens.

The curved input and output sidewall surface formations are achieved through photolithography and etching. This method is illustrated using a flowchart in FIG. 11. The fabrication step begins with the deposition of GRIN film as shown in step 1102. In step 1104, a metal layer or a polysilicon layer, which is later used as dry etch mask, is deposited on top of the GRIN film. A photoresist film is then spin-coated on the metal or polysilicon film in step 1106. The horizontal curved surface pattern is then made on a standard photomask in step 1108. The pattern is then transferred to the photoresist layer using UV exposure with the help of a standard mask aligner in step 1110. After the development of the photoresist, dry etching is employed to transfer the horizontal pattern from the photoresist to the metal or polysilicon in step 1112. Finally, in step 1114, dry etching of the GRIN film creates the desired curved surface structure by using the metal or polysilicon pattern as a dry etch mask. The curved sidewall profile is controlled by varying the plasma processing parameters such as temperature, induction coupled plasma power or RF power, DC biased voltage, chamber pressure and gas mixture.

Figure 12:
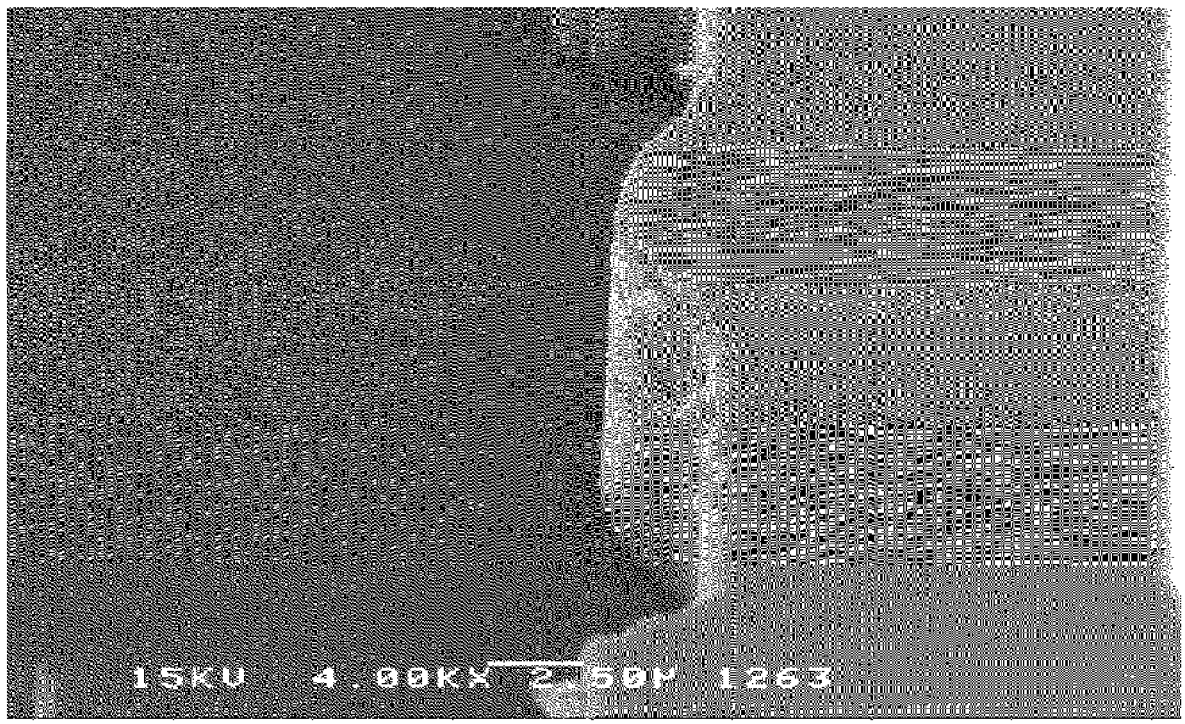
FIG. 12 shows a Scanning Electron Microscope (SEM) image of the dry etched vertical input sidewall of a superlens.
Figure 13:
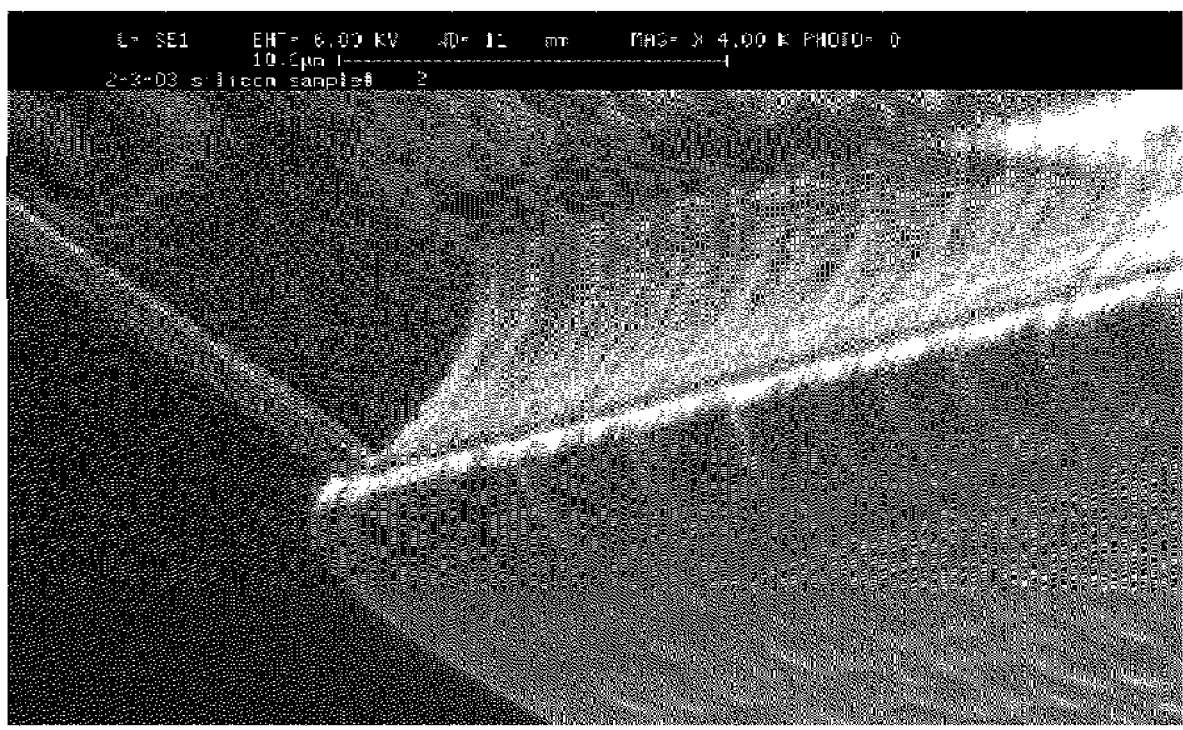
FIG. 13 shows a Scanning Electron Microscope (SEM) image of the dry etched curved sidewall surface.

An example of the dry etched vertical input sidewall of a superlens is shown in FIG. 12. While FIG. 12 shows a scanning electron microscope image of a vertical straight input sidewall, it is also possible to create vertically curved sidewall. This can be done by changing the plasma processing parameters, or by combining dry etching with wet etching. FIG. 13 shows such a case. The present invention also allows the use of dry or wet etching process to create desirable sidewall surface profiles of the superlens according to the needs.

The superlens structure of the present invention can be fabricated on any solid substrate. For example, the superlens can be directly fabricated on a Si, or GaAs, or InP substrate together with photonic and electronic ICs as well as fiber positioning grooves such as V or U-groove. In such a case, the connection between a superlens and channel waveguide is defined using photolithography, which provides inherent high precision alignment. Further, such a structure can be used in the same way as a lensed fiber. The superlens can also be fabricated on a substrate next to a flip-chip bonding area. This ensures that when a photonic chip is flip-bonded next to the superlens, its output beam is circularized. As a combination of the above two case, a superlens can be fabricated in between a fiber positioning V-groove and a flip-chip bonding region. The combined structure enables one to achieve completely passive fully automated photonic chip packaging and fiber pig-tailing.

Figure 14:
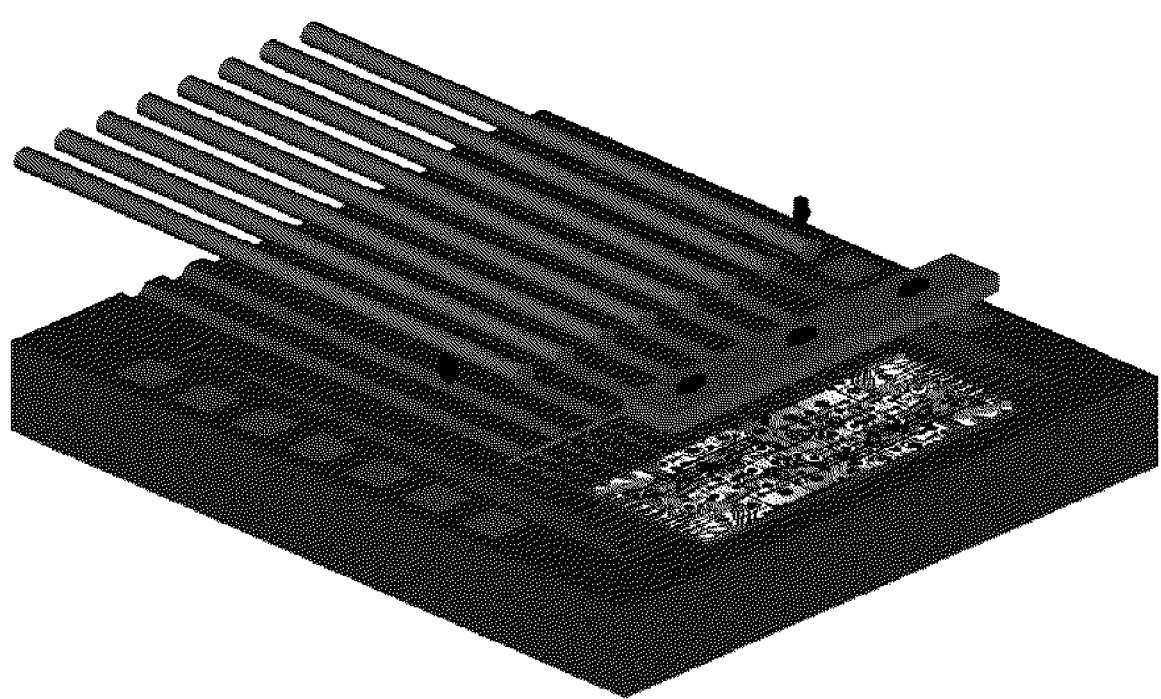
FIG. 14 illustrates the idea of simultaneous multi-channel light coupling using a superlens array-packaging platform.

Further, the superlens can also be fabricated in an array form. The array form superlens can then be applied to multi-channels light coupling into or out of a multi-port photonic chip. This is very difficult to achieve using individual lensed fibers. An example of array form superlens coupled to multi-port photonic chip is shown in FIG. 14.

As a further extension, the substrate material can be Si with microelectronic circuits for driving the photonic chip as well as for signal processing. The superlens can be fabricated on the Si substrate next to the photonic flip-chip bonding region. An advantage of such an arrangement is that the short distance between the photonic chip and the electronics circuits improves high-speed communication between optics and electronics.

While the preferred embodiment of the present invention is applicable to electromagnetic beam focusing, it can also be used in other applications. One example is in near-field optics for the transformation of an electromagnetic beam to a small mode size. In the existing technology, the transformation is achieved by tapering the fiber to a small tip (e.g., tens of nanometers) at one end and coating the outside of the tapered region with a metal film to prevent light from escaping. However, by this method, most of the light (as much as 99.99%) is lost during the electromagnetic beam size transformation process. Replacing such tapered fibers with the superlens of the present invention can improve the transmission efficiency substantially.

Another application relates to optical data storage, where the storage density can be limited by the spot size of light beams used to record and/or read the data. In existing optical storage devices, discrete optical elements (prisms, lenses, wave plates, etc.) are used to make the optical head and to focus a light beam from a semiconductor laser to a spot size of a few microns. Using a superlens according to an embodiment of the present invention, the focused spot size can be made much smaller, and the storage density can be substantially increased.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An apparatus suitable for controlling the size and the phase of an electromagnetic beam, the apparatus comprising:
   a. a substrate; and
   b. a vertically Graded Refractive index (vGRIN) multilayer structure deposited on the substrate, the multilayer structure including a vGRIN film and a curved input sidewall and a curved output sidewall, the input sidewall being a sidewall on which the electromagnetic beam is incident on the apparatus, the output sidewall being a sidewall through which the electromagnetic beam leaves the apparatus, wherein the apparatus is used to independently control a vertical focusing and a horizontal focusing of the electromagnetic beam, wherein the vGRIN film has a refractive index distribution $n(y)$, where y is a vertical direction substantially perpendicular to the direction of propagation of the electromagnetic beam.

2. The apparatus as recited in claim 1 wherein the curved input sidewall and the curved output sidewall are fabricated by photolithography and etching with an etching mask comprising:
   a. at least one of a metal layer and a polysilicon layer deposited on the vGRIN film; and
   b. a photoresist layer spin-coated on the at least one of the metal and the polysilicon layer.

3. The apparatus as recited in claim 1 wherein the substrate comprises at least one of a Si, GaAs, InP, AlN, $LiNbO_3$ and quartz composition.

4. The apparatus as recited in claim 1 wherein the substrate comprises a glass.

5. The apparatus as recited in claim 1, further comprising a waveguide operatively coupled to the apparatus, wherein a connection between the apparatus and the waveguide is established using photolithography.

6. The apparatus as recited in claim 1 wherein the apparatus is fabricated in an array form for multi-channel light coupling into or out of a multi-port photonic chip.

7. The apparatus as recited in claim 1 wherein the vertical focusing is controlled by varying a thickness of the vGRIN multilayer structure.

8. The apparatus as recited in claim 1 wherein the horizontal focusing is controlled by varying at least one of a radius of curvature of a surface of the curved input sidewall and a radius of curvature of a surface of the curved output sidewall.

9. The apparatus as recited in claim 7 wherein the thickness of the vGRIN multilayer structure is varied by etching.

10. The apparatus as recited in claim 1 wherein a radius of curvature of a surface of the curved input sidewall and a radius of curvature of a surface of the curved output sidewall are varied by etching.

11. The apparatus as recited in claim 1 wherein the electromagnetic beam leaving the apparatus is a divergent beam when a thickness of the vGRIN multilayer structure is in a range $((2n-1) \times f/4)$ and $(n \times f/2)$, where f is a pitch of the vGRIN film and n is a natural number.

12. The apparatus as recited in claim 1 wherein the electromagnetic beam leaving the apparatus is a convergent beam when a thickness of the vGRIN multilayer structure is in the range and $(n \times f/2)$ and $((2n+1) \times f/4)$, where f is a pitch of the vGRIN film and n is a natural number.

13. The apparatus as recited in claim 1, wherein a surface of the curved input sidewall and a surface of the curved output sidewall comprise one of a spherical shape, aspherical shape, cylindrical shape and toric shape.

14. The apparatus as recited in claim 13 wherein the surface of the curved input sidewall and the surface of the curved output sidewall have same radii of curvature.

15. The apparatus as recited in claim 13 wherein the surface of the curved input sidewall and the surface of the curved output sidewall have different radii of curvature.

16. The apparatus as recited in claim 13 wherein a radius of curvature of the surface of the curved input sidewall and a radius of curvature of the curved output sidewall are positive.

17. The apparatus as recited in claim 13 wherein a radius of curvature of the surface of the curved input sidewall and a radius of curvature of the surface of the curved output sidewall of the input sidewall have same signs.

18. The apparatus as recited in claim 13 wherein a radius of curvature of the surface of the curved input sidewall and a radius of curvature of the surface of the curved output sidewall of the input sidewall have different signs.

19. The apparatus as recited in claim 1 wherein a surface of the curved input sidewall and a surface of the curved output sidewall have arbitrary curved shapes.

20. The apparatus as recited in claim 1 wherein a vertical refractive index profile of the vGRIN film comprises an arbitrary refractive index variation.

21. The apparatus as recited in claim 1 wherein at least one of the curved input sidewall and the curved output sidewall comprises an anti-reflection coating.

22. The apparatus as recited in claim 21 wherein the anti-reflection coating is designed on a basis of at least one of a central refractive index, an average refractive index, and an optimum equivalent index that leads to a maximum electromagnetic wave transmission.

23. The apparatus as recited in claim 1 wherein the curved input sidewall and the curved output sidewall comprise a three-dimensional curved surface such that a radius of curvature of the curved input sidewall and a radius of curvature of the curved output sidewall diminish with a departure from a vertical central region of the vGRIN film.

24. The apparatus as recited in claim 1 wherein the refractive index distribution n(y) is a standard distribution.

25. The apparatus as recited in claim 1 wherein the refractive index distribution n(y) is parabolic.

26. The apparatus as recited in claim 1 wherein the electromagnetic beam leaving the apparatus has at least one of a circular spot size and an elliptical spot size.

27. The apparatus as recited in claim 1 wherein a wavelength of the electromagnetic wave is in the visible range.

28. The apparatus as recited in claim 1 wherein a wavelength of the electromagnetic wave is in the Radio Frequency (RF) range or in the TeraHertz range.

29. The apparatus as recited in claim 18 wherein the radius of the curvature of the surface of the curved input sidewall is positive and the radius of curvature of the surface of the curved output sidewall is negative.

\* \* \* \* \*